3,770,628
METHOD OF TREATING OIL-CONTAINING CONTAMINATED DRAINAGE
Jiro Yamamoto and Kazuo Minakawa, Yokohama, Hideki Nishikado, Kawasaki, and Shintaro Imon, Yokohama, Japan, assignors to Nippon Oil Company, Limited, Tokyo, Japan
Filed July 10, 1972, Ser. No. 270,081
Claims priority, application Japan, July 16, 1971, 46/52,450; Jan. 21, 1972, 47/7,669
Int. Cl. B01d 17/04
U.S. Cl. 210—40     11 Claims

ABSTRACT OF THE DISCLOSURE

Oil-containing contaminated drainage can be effectively clarified by passing the same through a wax-filled bed. In the preferred embodiment the treatment of oil-containing contaminated drainage as set forth above is carried out by the use of combination process selected from (a) a wax-filled bed—an active carbon bed process, (b) a sandfilter—a wax-filled bed process, and (c) a sandfilter— a wax-filled bed—an active carbon bed process.

BACKGROUND OF THE INVENTION

(1) Field of the invention

This invention relates to treatment of oil-containing contaminated drainage and more particularly to treatment of oil-containing contaminated drainage comprising clarification of oil-containing contaminated drainage by passing the same through a wax-filled bed alone or combination process selected from (a) a wax-filled bed—an active carbon bed process, (b) a sandfilter—a wax-filled bed process, and (c) a sandfilter—a wax-filled bed—an active carbon bed process.

(2) Description of the prior art

A variety of methods have heretofore been conducted for separation and removal of various contaminants including oil contained in the contaminated drainage. For example, the most simple and fundamental method for the treatment of drainage involves use of so-called separator in which oil-containing drainage is settled and water containing less oil is drained off. The method by means of a gravity separation, however, is of a low effect when the oil content is present in microparticle in the drainage. It is much less effective when the oil is in emulsion. In order to avoid pollution of environments treatment of oil-containing drainage has recently become an important technical problem in industries such as petroleum refining wherein mineral oil is handled and mechanical industry associated by the use of oil. There has arisen needs for improved drainage treatment technology, particularly for oil separation and removal technology as a result of increase in the quantity of oil-containing drainage associated with industrial development, increase in the drainage containing hardly separable oil accompanied by diversified and more strict conditions under which oil is used, increase in phenols and oxidizable contaminants indicated in terms of COD and BOD as well as issue of more strict standard for the drainage.

For dissolving these technical problems are known besides the above-mentioned separator system, for example, methods involving the use of an adsorbent such as fibers, sand, hay or active carbon and ones involving the use of a filter made of a net of molded high-molecular polyolefin (polyethylene and polypropylene), polyurethane or the like. However, as shown in reference examples below, these materials are not satisfactory in adsorption of oil and coalescing capacity (which is capacity of uniting and enlarging oil droplets, the higher the capability the easier is the settlement and separation) and the use of a large amount of adsorbant such as active carbon is expensive so that better separation technology of oil content is desired.

On the other hand, attempts have been made of removal of the oil content by the use of activated sludge to which utilizability of microorganisms is applied. This method, however, is disadvantageous in that capacity of removing the oil is not sufficient but is considerably affected by change in nature of the subject oil-containing drainage such as quantity of impurities, for example, hydrogen sulfide and COD as well as in flow rate. It also meets problems of difficulty in operation control, high cost of equipment and disposal of excess sewage.

SUMMARY OF THE INVENTION

The present invention represents solution of these problems which relates to a method of effectively clarifying oil-containing contaminated drainage. After an extensive investigation of the aforementioned problems we have now found that intimate contact of oil-containing drainage with wax in a vessel filled with wax results in highly effective adsorption of the oil content on the wax even if oil particles in the oil-containing drainage are very fine as well as in formation of larger droplets of the oil from the fine droplets by development of high coalescing capability, which enables effective separation and removal of the oil content by settlement.

It is an object of this invention to provide a method of treating oil-containing drainage which makes full use of the adsorbing and coalescing capacities of wax.

Another object of the invention is to provide a method of treating oil-containing drainage by the use of a wax-filled bed which is operable for a long period of time.

A further object is to provide a method of treating oil-containing drainage which enables long-term effective removal of impurities in the water to be treated even in cases where it is difficult for the wax alone to maintain the concentration of impurities in the water to be treated at a very low level for a sufficiently long period of time.

DESCRIPTION OF THE INVENTION

Figure 1:
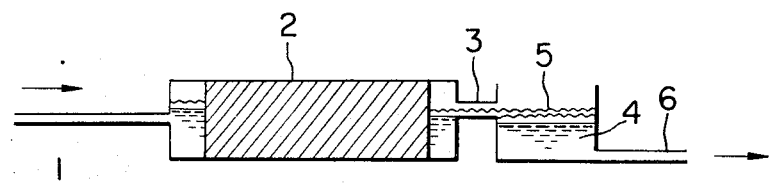
FIG. 1 illustrates the equipment used for carrying out the invention wherein a wax-filled bed alone is employed and the procedures using the same. Referring to the drawing reference numeral 1 represents an inlet conduit for the oil-containing drainage, 2 a vessel filled with granular wax, 3 an outlet conduit of the drainage passed through the wax-filled vessel 2 and following adsorption of a considerable portion of the oil content, 4 a settling tank, 5 an oil layer consisting of larger oil drops resulted from the coalescence by passing through the wax-filled vessel 2 and 6 an outlet conduit for the clarified water containing substantially or almost no oil. Arrows indicate the direction of operation.

While the surface of solid wax is known to be very highly hydrophobic, it is a noteworthy phenomenon that contact of oil-containing drainage with the surface of wax results in highly effective absorption of the oil content on the surface of wax. However, the present invention is based not only upon application of the absorption phenomenon mentioned above but also upon application of coalescing capability of the surface of wax associated with the adsorption function. "Coalescing" means capacity of uniting the oil content dispersed in fine oil droplets in the drainage to larger oil drops. In the case of conventional abtorbents that are low in coalescing capability, the oil content in the drainage, which is no more adsorbed on the absorbent beyond the absorbing capacity, is passed in fine oil droplets as it is through the absorbent and consequently cannot be separated. On the other hand, on the surface of wax the oils dispersed in fine particle in the drainage are adsorbed, which are in turn grown on the surface of wax. When a certain amount of the oil has been adsorbed upon the surface of wax, large oil drops from the surface of wax float on the drainage and absorbing capacity of the wax is recovered.

According to the present invention the wax can be used for a very long period of time, and almost permanently in some cases where contaminants in the oil-containing drainage such as rubber, soil sand and metal powders are at a low level. The wax is hardly affected by chemicals such as acids, alkalies and alcohols contained in the oil-containing drainage.

We have also found that remarkable improvements in capacity of removing impurities for more efficient use of the process of treating drainage with wax for a longer period of time is achieved by the combination with known absorbents.

One of the methods of removing impurities in drainage involves pretreatment of the drainage with wax and the additional treatment with active carbon, which combination enables not only highly efficient removal of the impurities but also marked elongation of the life of active carbon. In the treatment of drainage active carbon is so expensive that it is not economical in treating the drainage containing oil in a high concentration while being effective. On the other hand, active carbon is excellent in capacity of adsorbing a low concentration of impurities.

In this connection it has now been found that combined process utilizing wax and active carbon has an excellent drainage treating capacity for removing the oil content of wastes, and in addition, being effective for a long period of time. For example, in the removal of most of the oil content with wax and of the remaining substances with active carbon, the amount of phenol at adsorption equilibrium is increased from one and a half times to twice as much as the initial when the oil content at the inlet to active carbon is 20–30 p.p.m.

On the other hand, it is necessary to keep the surface of wax as clean as possible in order to attain satisfactory performance of the excellent oil-removing capability of wax. In this respect we have found that placement of a sandfilter prior to the wax bed for removal of substances rapidly deteriorating the adsorbing capability of wax such as suspending solid particles prevents contamination of the surface of wax with the suspending solid materials. Sandfilter is a mass comprising sand as the filter aid which is preferably hard quartz sand conventionally used. It is preferred to use one with an average particle size within the range from about 3 mm. to 0.1 mm.

The sandfilter is able to remove not only suspending matters of large sizes but also fine solid suspending matters contained in the drainage. Such floating or suspending matters cover the surface of wax and further inhibit the wax bed from effective removal of the oil content.

We have confirmed that removal of these suspending solid particles with a sandfilter prior to the treatment of drainage with wax causes not only higher efficiency of the removal of oil content with wax but also prevention of deterioration and marked prolongation in the period of use of the wax. For example, when drainage from an oil refinery containing suspending solid particles at about 13 p.p.m. was treated in a wax tank at $SV=12$ (that is, 12 volumes of the water are passed through one volume of the adsorbent wax per unit of time), the oil content was reduced only to about 2 p.p.m. without the sandfilter whereas to 0.9 p.p.m. or below with the sandfilter equipped and the period of continuous use of the wax was prolonged from 3 months to 6 months.

We have further found that when contents in drainage of solid suspending matters and oil are high but contents in the final treated drainage of solid suspending matters, oil and other organic materials are required to be reduced to very low levels successive treatment of said drainage with sandfilter, wax and active carbon in the given order gives rise to full demonstration of drainage treating characteristics of each component thereby producing excellent results in the drainage treatment as well as causing a prolonged term of use.

The wax used in the present inventon may be, for example, petroleum wax obtained in dewaxing the distillate from vacuum distillation of crude oil, microwax obtained in dewaxing an deasphalting the residual oil from vacuum distillation of crude oil, a variety of wax-containing components that are intermediates in the production of the abovementioned waxes such as slack wax, crude wax containing much oil obtained from the solvent-dewaxing step and the like.

The wax is preferably used in the form with a surface area as large as possible. In order to achieve the object, the wax may be used after formation of globes with a small diameter, columns, Raschig rings or flakes.

The wax-filled bed as referred to in this invention is wax of a form as mentioned above filled in a closed vessel equipped with a feed inlet and a discharge outlet within or in connection to which there is an area for settling and separating the coalesced drops of oil.

In carrying out the process of the present invention it is preferred to feed the oil-containing drainage into the wax-filled bed from the upper portion and discharge the drainage from the lower portion. However, the oil-containing drainage may be fed from one side of the wax-filled bed and discharged from the opposite side. According to the former way of treating the drainage, most of the coalesced oil content is separated in the area for settlement of the drainage situated in the latter part of the wax layer and passed through a conduit for the separated oil to the top of the wax layer, in which it floats and can be discharged through another outlet. The foregoing process is highly effective for clarifying oil-containing drainage.

The active carbon as referred to in this invention is conventional active carbon composed mainly of carbon and capable of adsorbing a variety of subsances. It may be in granule or in powder.

The temperature at which the contaminated drainage is passed and contacted according to the present invention may not be specified provided that the wax is not melted, and is preferably ordinary temperatures. The pressure applied is also of no restriction but operation under a slightly elevated pressure is preferred in consideration of pressure loss due to the contact.

In order to facilitate understanding of the invention embodments of the invention will be described with reference to FIGS. 1 and 2.

FIG. 1 represents an illustrative embodiment of the present invention. Oil-containing drainage is introduced through the inlet conduit 1 into the vessel 2 filled with particulate wax, in which oil content in the drainage is adsorbed on the surface of wax. Larger droplets of the oil coalesced are passed through the conduit 3 to the settling tank 4, in which an oil layer is readily formed as the upper layer and the oil is easily separated. The clarified water containing no oil is discharged through the conduit 6.

Figure 2:
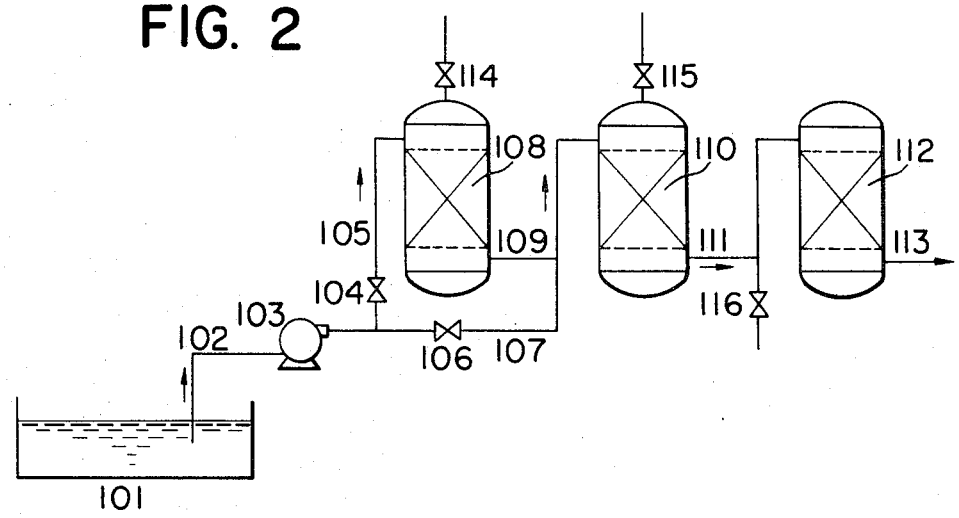
FIG. 2 is an illustrative flow chart of the method of treating drainage in which combination of a wax-filled layer, a sandfilter layer and/or an active carbon layer is used. Reference numeral 101 represents an API separator, 102 a conduit, 103 a pump, 104 a valve, 105 a conduit, 106 a valve, 107 a conduit, 108 a sandfilter layer, 109 a conduit, 110 a wax-filled layer, 111 a conduit, 112 an active carbon layer, 113 a conduit, 114 a valve, 115 a valve and 116 a conduit.

FIG. 2 is an illustration of preferable embodiments of the invention. Separation of dusts of large meshes and oil content separable by settlement is carried out in the API separator 101 and the drainage from the API separator is introduced through the conduit 102 and pressurized by means of the pump 103. If much suspending solid matters, oil and other organic materials are present as in some of drainage, the drainage is introduced with the valve 104 opened through the conduit 105 into the sandfilter layer 108. The sandfilter layer is effective in removal of the suspending solid matters and the resulting drainage is passed through the conduit 109 to the wax bed 110, which is filled with granular wax and is effective mainly in adsorption of the oil droplets upon the surface of wax. When a certain amount of the oil has been adsorbed upon the wax there are formed larger drops of the oil, which are accumulated in the upper part of the wax layer. The oil accumulated in the upper part of the wax bed is drawn through the valve 115. The drainage from which most of the oil content has been removed in the wax bed is introduced through the conduit 111 into the active carbon bed 112. In the active carbon bed 112 there are removed the oil and other organic materials remaining in minimum amounts due to adsorbing capacity characteristic of active carton. The treated water is discharged through the conduit 113.

Depending upon the nature of drainage to be treated and the standard for the drainage, mere combination of the sandfilter layer 108 and the wax layer 110 is satisfactory in some cases. In such cases, the clarified drainage is drawn from the conduit 116. With drainage containing less suspending solid matters the sandfilter layer is omitted and the drainage is introduced through the valve 106 into the conduit 107 and treated successively with the wax layer 110 and the active carbon layer 112.

The valve 114 arranged at the top of the sandfilter 108 is provided for drawing the coalesced oil accumulated after adsorption, growth to larger oil drops and separated from the surface of the sandfilter.

When the surface of wax is attacked mainly by the contaminants and additionally by abrasion and consequently the capacity of removing oil is reduced, the filled wax may be replaced. The spent wax may be reused by clarifying the surface and otherwise it may be used as fuel or admixed with crude oil for petroleum refining step.

Oil-containing drainage which is the subject of the oil removal according to the present invention is drainage containing a variety of waste oils which may be mineral oil from gasoline through heavy oil or edible oil and may be in the form of very fine particles, for example, $10\mu$ or below in size or in the form of emulsion.

DESCRIPTION OF THE PREFERRED EMBODIMENTS

The invention will be described in greater detail in conjunction with the following specific examples.

EXAMPLES 1 AND 2

Removal of the oil content by absorption was conducted on drainage containing oil at a concentration of 12 p.p.m. by passing the same through a vessel filled with globular wax particles (M.P. 60° C. and oil content 0.4%) 1 mm. in diameter and pelleted wax particles (M.P. 55° C. and oil content 0.4%) 3 mm. x 5 mm. in diameter at ordinary temperature. The results are shown in Table 1 in comparison with those in the case where a commercially available oil absorbent was employed.

TABLE 1

| | Oil content in the drainage— | | Ratio of removal | L.H.S.V. (liter hr.) [2] |
|---|---|---|---|---|
| | Before treatment (p.p.m.) | After treatment (p.p.m.) [1] | | |
| Example: | | | | |
| 1 | 12 | 0.6 | 95 | 7.9 |
| 2 | 12 | 0.8 | 93 | 7.9 |
| Reference example: | | | | |
| 1 [3] | 12 | 10.1 | 16 | 7.9 |
| 2 [4] | 12 | 2.5 | 79 | 7.9 |
| 3 [5] | 12 | 8.6 | 29 | 7.9 |

[1] Oil content in the aqueous layer after separation by settlement.
[2] 1 m.³ of the drainage supplied per m.³ of the wax per hour.
[3] Commercially available product composed mainly of fibrous polyurethane.
[4] Commercially available product composed mainly of fibrous polypropylene.
[5] Commercially available product composed mainly of fibrous polyolefins.

As evidently seen from the results above, the method according to the invention is highly effective for removal of the oil in oil-containing drainage.

EXAMPLE 3

In a vertical drum 1 m. in diameter and 2 m. in height was placed globular microwax 1 mm. in diameter (M.P. 70° C. and oil content 0.3%) to a wax layer of 1.2 m.³

Oil-containing drainage was passed at ordinary temperature through the wax layer at an LHSV of 30 vol./vol./hr. The contacted drainage was then passed to a settlement tank from the bottom of which the treated water was drawn as the drainage. The experiment was continued for 30 days. The results are shown in Table 2.

TABLE 2

| | Oil content in the drainage— | |
|---|---|---|
| Progress | Before treatment (p.p.m.) | After treatment (p.p.m.) |
| 1 day | 6.4 | 1.3 |
| 5 days | 6.0 | 0.8 |
| 10 days | 2.0 | 0.4 |
| 20 days | 10.3 | 1.4 |
| 30 days | 2.2 | 0.5 |

As evidently seen from the results above, the method is excellent in view of the fact that no reduction in ratio of the oil removed occurred after progress of 30 days at such a high rate of the treated drainage at an LHSV of 30.

EXAMPLE 4

An experiment was made in the same way as in Example 3 except for the wax layer being 5 times as much and an LHSV of 6 vol./vol./hr.. The treated drainage containing oil at 1 p.p.m. or below was obtained through the progress of 40 days.

EXAMPLES 5 AND 6

Experiments were made in the same way as in Examples 1 and 2 using a variety of waxes. The results are shown in Table 3. The wax was placed in a horizontal box 5 cm. in height x 50 cm. in length x 10 cm. in width.

TABLE 3

| Nature of the wax | Form of the wax | Oil content in the drainage Before treatment (p.p.m.) | Oil content in the drainage After treatment (p.p.m.) | Contact L.H.S.V. (liter/hr.) |
| --- | --- | --- | --- | --- |
| Example: | | | | |
| 5 .......... Slack wax (M.P. 55° C. and oil content 1.5%) .......... | Flake .......................................... | 30 | 1.3 | 10 |
| 6 .......... Paraffin wax (M.P. 55° C. and oil content 0.4%) ...... | Pellet 5 mm. in diameter x 3 mm ............ | 30 | 1.0 | 10 |

EXAMPLE 7

An active carbon layer was arranged subsequent to a wax layer for the equipment of drainage treatment. The feed drainage for the treatment was one following removal of large dusts and oil films by means of API separator. The feed drainage contained COD at 33 p.p.m., phenol at 7.3 p.p.m., normal hexane soluble oil content at 19.1 p.p.m. and floating solid matters at 21.3 p.pm and had a pH of 9.2.

Volume of the wax layer was 145 liters which was filled with molded paraffin wax of M.P. 145° F. 1 cm. in diameter and 5 mm. in height. The active carbon layer was filled with 72 liters of particulate active carbon CAL.

In Control 1 was treated the feed drainage with the above-mentioned wax layer filled with particulate active carbon instead of wax. Volume of the water treated was 3 kl./hr.

Properties of the treated drainage are shown in Table 4.

TABLE 4

| | Example 7 | Control 1 |
| --- | --- | --- |
| After 0 hr.: | | |
| COD (p.p.m.) ............................. | 5.3 | 4.8 |
| Phenol (p.p.m.) ........................... | <0.01 | <0.01 |
| After 24 hrs.: | | |
| COD (p.p.m.) ............................. | 7.1 | 8.4 |
| Phenol (p.p.m.) ........................... | 0.02 | 0.03 |
| After 48 hrs.: | | |
| COD (p.p.m.) ............................. | 7.8 | 10.9 |
| Phenol (p.p.m.) ........................... | 0.02 | 0.08 |
| Amount of phenol at equilibrium adsorption (g./kg.) .................................... | 82 | 53 |
| Amount of COD at equilibrium adsorption (g./kg.) .................................... | 227 | 140 |
| Differential pressure ..................... | (¹) | (²) |

¹ 2 kg./cm.² in 5 days.
² 2 kg./cm.² in 3 days.

Comparison between Example 7 and Control 1 reveals that: At the initiation of the drainage treatment, namely, after 0 hour, active carbon in Control 1 has superior adsorption capacity, whereas both COD and phenol contents are superior after 24 hours and far superior after 48 hours in Example 7, thus indicating less ratio of reduction in adsorption capacity than in Control 1. Far larger amounts of phenol and COD at adsorption equilibrium and smaller ratio of rise in differential pressure in Example 7 indicate that the method of treating drainage according to the invention is excellent one.

EXAMPLE 8

Subsequent to a sandfilter layer was arranged a wax layer to prepare an equipment for drainage treatment.

The feed drainage was ballast water discharged from a tanker which contained oil at 11.8 p.p.m. and suspending solid matters at 13.2 p.p.m.

The sandfilter was prepared by placing 3 m.³ of sand 0.5 mm. in diameter and the wax was 5 m.³ of the same one as in Example 7.

In Control 2 the drainage was treated with the wax layer alone. The results are shown in Table 5 wherein they are indicated in terms of oil content and amount of suspending solid matter in the water after the treatment for 24 hours as well as of contamination of the wax layer, interval of counter washing of the wax layer and interval of periodical cleaning of the wax layer.

TABLE 5

| | Example 8 | Control 2 |
| --- | --- | --- |
| Oil content (p.p.m.) ............. | 0.9 ................. | 2.1. |
| Floating solid matters (p.p.m.) . | 2.8 ................. | 10.1. |
| Contamination of the wax layer. | Almost no ........ | High. |
| Counter washing of the wax layer. | Once in a month or longer. | Once in 10 days. |
| Cleaning of the wax layer ...... | Once in 6 months or longer. | Once in 3 months. |

As evidently shown in Table 5, the method according to the present invention provides excellent capacity of drainage treatment and maintenance of very high clearness against contamination of the wax layer. Accordingly, the interval of counter washing or cleaning of the wax layer is very long.

EXAMPLE 9

The same equipment as on FIG. 2 was used. The sandfilter layer 180 liters in volume was filled with sand 0.5 mm. in diameter. The wax and active carbon layers used were the same as in Example 7. The drainage was one from an API separator which was the same as in Example 7.

In Control 3 the drainage was treated with combination of the sandfilter and active carbon layers. The treated amount was 3 kl./hr.

The results are shown in Table 6.

TABLE 6

| | Example 9 | Control 3 |
| --- | --- | --- |
| After 24 hours: | | |
| COD (p.p.m.) .............................. | 6.2 | 8.0 |
| Phenol (p.p.m.) ............................ | 0.02 | 0.03 |
| Oil content (p.p.m.) ....................... | 0.6 | 1.1 |
| Suspending solid matters (p.p.m.) ........ | 3.1 | 4.2 |
| Amount of phenol at equilibrium adsorption (g./kg.) .................................... | 94 | 75 |
| Amount of COD at equilibrium adsorption (g./kg.) .................................... | 271 | 213 |

As clearly shown in Table 6, the results after 24 hours of charge of the drainage are superior in Example 9 with all of the phenol, COD, oil and suspending solid matter contents. Amounts of both phenol and COD at equilibrium absorption are higher in Example 9. Almost no contamination of the active carbon layer was observed in Example 9 wherein the use could be continued over 6 months without cleaning. The differential pressure was raised by 2 kg./cm.² after 2 months. On the other hand, the active carbon layer was so highly contaminated that the cleaning was necessary once in 2 months and the differential pressure was raised by 2 kg./cm.² after 5 days. It follows that the treatment of drainage according to Control 3 is far less durable.

We claim:

1. Method of treating oil-containing contaminated drainage which comprises passing the oil-containing contaminated drainage through a wax-filled porous bed.

2. Method according to claim 1 wherein the oil-containing contaminated drainage is an aqueous emulsion of fine droplets of mineral oil from gasoline through heavy oil or edible oil.

3. Method according to claim 1 wherein the wax used in the wax-filled bed is selected from petroleum wax, microwax and slack wax.

4. Method according to claim 1 wherein the wax used in the wax-filled bed is in the form of small globes, small columns, Raschig rings or flakes.

5. Method according to claim 1 wherein the oil-containing contaminated drainage is fed from the upper portion and discharged from the lower portion of the wax-filled layer and the coalesced oil content is removed from the upper portion of the bed.

6. Method according to claim 1 wherein the oil-containing contaminated drainage is fed from one side and discharged from the opposite side of the wax-filled bed and the coalesced oil content discharged in association with the discharged water is subsequently separated in a settlement layer.

7. Method of treating oil-containing contamined drainage which comprises passing the oil-containing contaminated drainage through a wax-filled porous bed and subsequently through an active carbon bed.

8. Method of treating oil-containing contaminated drainage which comprises passing the oil-containing contaminated drainage through a sandfilter and subsequently through a wax-filled porous bed.

9. Method according to claim 8 wherein the sandfilter used in the sandfilter is composed of quartz sand from about 3 mm. to 0.1 mm. in average particle size.

10. Method according to claim 8 wherein the oil-containing contaminated drainage is fed from the upper portion and discharged from the lower portion of the sandfilter and then fed from the upper portion and discharged from the lower portion of the wax-filled bed and the coalesced oil content is removed from the tops of the sandfilter and wax-filled bed.

11. Method of treating oil-containing drainage which comprises passing the oil-containing contaminated drainage through a sandfilter, subsequently through a wax-filled porous bed and finally through an active carbon bed.

References Cited

UNITED STATES PATENTS

| | | | |
|---|---|---|---|
| 3,084,433 | 3/1963 | Hengstebeck | 208—188 X |
| 3,417,159 | 12/1968 | Ffrench et al. | 208—188 X |

SAMIH N. ZAHARNA, Primary Examiner

I. CINTINS, Assistant Examiner

U.S. Cl. X.R.

208—188